(12) United States Patent
Markell

(10) Patent No.: US 9,453,994 B2
(45) Date of Patent: Sep. 27, 2016

(54) LUMINAIRE

(75) Inventor: Kevin Markell, Davison, MI (US)

(73) Assignee: OSRAM Opto Semiconductors GmbH (DE)

( * ) Notice: Subject to any disclaimer, the term of this patent is extended or adjusted under 35 U.S.C. 154(b) by 525 days.

(21) Appl. No.: 13/395,750

(22) PCT Filed: Sep. 25, 2009

(86) PCT No.: PCT/US2009/058312
§ 371 (c)(1),
(2), (4) Date: Jul. 30, 2012

(87) PCT Pub. No.: WO2011/037573
PCT Pub. Date: Mar. 31, 2011

(65) Prior Publication Data
US 2012/0287628 A1    Nov. 15, 2012

(51) Int. Cl.
| F21V 21/002 | (2006.01) |
| G02B 19/00 | (2006.01) |
| F21V 5/04 | (2006.01) |
| F21V 9/16 | (2006.01) |
| F21Y 101/02 | (2006.01) |
| F21Y 103/00 | (2016.01) |
| F21Y 103/02 | (2006.01) |
| F21V 29/504 | (2015.01) |

(52) U.S. Cl.
CPC ............. G02B 19/0028 (2013.01); F21S 4/22 (2016.01); F21V 5/043 (2013.01); F21V 9/16 (2013.01); G02B 19/0066 (2013.01); F21V 29/504 (2015.01); F21Y 2101/02 (2013.01); F21Y 2103/003 (2013.01); F21Y 2103/02 (2013.01)

(58) Field of Classification Search
None
See application file for complete search history.

(56) References Cited

U.S. PATENT DOCUMENTS

| 5,559,681 | A | * | 9/1996 | Duarte .......................... 362/231 |
| 5,748,382 | A | | 5/1998 | Maguire, Jr. |
| 5,848,837 | A | * | 12/1998 | Gustafson ..................... 362/235 |
| 6,354,714 | B1 | | 3/2002 | Rhodes |
| 6,673,292 | B1 | * | 1/2004 | Gustafson et al. ........... 264/149 |
| 6,793,369 | B2 | | 9/2004 | Calzaretta et al. |
| 6,829,852 | B1 | | 12/2004 | Uehran |
| 7,582,911 | B2 | | 9/2009 | Lynch et al. |
| 2003/0223233 | A1 | | 12/2003 | Calzaretta et al. |
| 2006/0105485 | A1 | * | 5/2006 | Basin ..................... H01L 24/97 |
|  |  |  |  | 438/27 |

(Continued)

FOREIGN PATENT DOCUMENTS

| JP | 2009-043566 | 2/2009 |
| JP | 2009-158274 | 7/2009 |

(Continued)

OTHER PUBLICATIONS

Notification of the First Office Action dated Sep. 27, 2013 from Chinese Patent Office for CN Application No. 200980161595.6.

*Primary Examiner* — Britt D Hanley
(74) *Attorney, Agent, or Firm* — DLA Piper LLP (US)

(57) ABSTRACT

A luminaire includes a earner having a mounting surface, at least two % M-emitting diodes, each light-emitting diode having a radiation exit surface, an optical element having a radiation entrance surface, wherein the light-emitting diodes are arranged on the mounting surface of the carrier, the optical element is arranged on a side of the light-emitting diodes facing away from the carrier, and the radiation exit surface of each light-emitting diode is optically coupled to the radiation entrance surface of the optical element.

21 Claims, 3 Drawing Sheets

(56) References Cited

U.S. PATENT DOCUMENTS

2006/0267028 A1   11/2006  Lynch et al.
2009/0219713 A1    9/2009  Siemiet et al.

FOREIGN PATENT DOCUMENTS

WO      00/31463    6/2000
WO    2009/093167  7/2009

* cited by examiner

LUMINAIRE

RELATED APPLICATION

This is a §371 of International Application No. PCT/US2009/058312, with an international filing date of Sep. 25, 2009 (WO 2011/037573, published Mar. 31, 2011), the subject matter of which is incorporated by reference.

TECHNICAL FIELD

This disclosure relates to luminaries.

BACKGROUND

U.S. Pat. No. 7,582,911 relates to a luminaire and discloses a modular light emitting diode mounting configuration and includes a light source module having a plurality of pre-packaged light emitting diodes arranged in a serial array.

It could, however, be helpful to provide a luminaire which is easy to produce.

SUMMARY

I provide luminaires including a carrier having a mounting surface, at least two light-emitting diodes, each light-emitting diode having a radiation exit surface, an optical element having a radiation entrance surface, wherein the light-emitting diodes are arranged on the mounting surface of the carrier, the optical element is arranged on a side of the light-emitting diodes facing away from the carrier, and the radiation exit surface of each light-emitting diode is optically coupled to the radiation entrance surface of the optical element.

I also provide a luminaire including a carrier having a mounting surface, at least two light-emitting diodes, each light-emitting diode having a radiation exit surface, an optical element having a radiation entrance surface, wherein the light-emitting diodes are arranged on the mounting surface of the carrier, the optical element is arranged on a side of the light-emitting diodes facing away from the carrier, the radiation exit surface of each light-emitting diode is optically coupled to the radiation entrance surface of the optical element, the carrier and the optical element are flexible, and the optical element is a sole optical element of the luminaire.

BRIEF DESCRIPTION OF THE DRAWINGS

In the following, luminaires are described in more detail with regard to representative structures/forms.

DETAILED DESCRIPTION

Figure 1A:
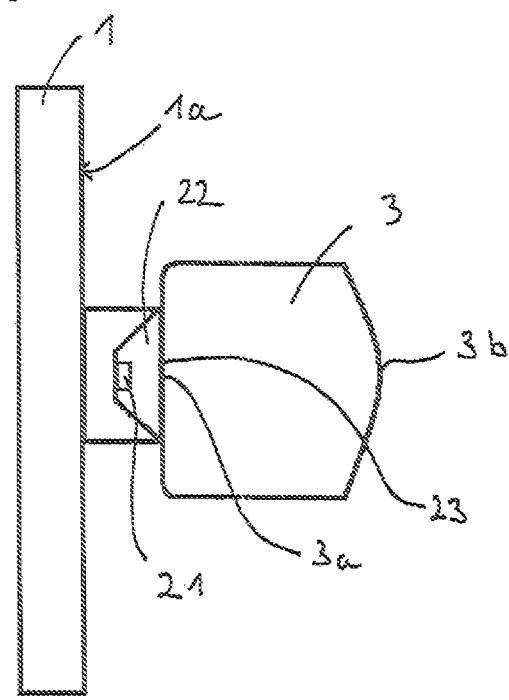
FIGS. 1A and 1B schematically show a first structure of a luminaire.

According to at least one example of the luminaire, the luminaire comprises a carrier which has a mounting surface. The carrier is, for example, a circuit board. In this case, the carrier comprises a base body which is formed with an electrically insulating material. In or on the base body, conducting paths are applied. The circuit board is, for example, a printed circuit board, a flexible circuit board, a metal core circuit board or a ceramic circuit board.

The carrier has a mounting surface for mounting elements of the luminaire on the carrier. For example, connecting points are applied to the mounting surface of the carrier. Elements of the luminaire can be electrically connected to these connection points.

According to at least one example of the luminaire, the luminaire comprises at least two light-emitting diodes, each light-emitting diode having a radiation exit surface. Radiation, for example, light produced by the light-emitting diodes, is emitted through the radiation exit surfaces of the light-emitting diode.

The light-emitting diodes can comprise a housing for at least one light-emitting diode chip. Further, it is possible that at least one light-emitting diode of the luminaire is free from a housing and is, therefore, given by a light-emitting diode chip.

According to at least one example of the luminaire, the luminaire comprises an optical element having a radiation entrance surface. The optical element is, for example, designed to focus or disperse light passing through the optical element. The optical element has a radiation entrance surface through which a radiation, e.g., light, can enter the optical element.

According to at least one example of the luminaire, the light-emitting diodes are arranged on the mounting surface of the carrier. For example, all light-emitting diodes of the luminaire are arranged on the mounting surface of the carrier. The light-emitting diodes are, for example, electrically and mechanically connected to connection points of the circuit board which forms the carrier.

According to at least one example of the luminaire, the optical element is arranged on a side of the light-emitting diodes which faces away from the carrier. It is possible that the optical element is mechanically fixed to the side of the light-emitting diodes facing away from the carrier. It is further possible that the optical element is in direct contact with each light-emitting diode of the luminaire. "Direct contact" also comprises constructions where a connection material is arranged between the light-emitting diodes and the optical element.

According to at least one example of the luminaire, the radiation exit surface of each light-emitting diode is optically coupled to the radiation entrance surface of the optical element. For example, this can be accomplished by placing the optical element directly on the radiation exit surface of each light-emitting diode. It is further possible that a light guiding material like, for example, an optical adhesive is arranged between the light exit surface of each light-emitting diode and the radiation entrance surface of the optical element.

According to at least one example of the luminaire, the luminaire comprises a carrier having a mounting surface, at least two light-emitting diodes, each light-emitting diode having a radiation exit surface, and an optical element having a radiation entrance surface. The light-emitting diodes of the luminaire are arranged on the mounting surface of the carrier, the optical element is arranged on a side of the light-emitting diode facing away from the carrier, and the radiation exit surface of each light-emitting diode is optically coupled to the radiation entrance surface of the optical element.

That is to say, at least according to one example of the luminaire, all light-emitting diodes of the luminaire are optically coupled to the same optical element which focuses or disperses the radiation passing through the optical element. Instead of lighting the optical element from its ends, it is therefore possible to light the entire length of the optical element.

According to at least one example of the luminaire, the optical element is an extruded optical element. In other words, the optical element is formed by extrusion. Extrusion is a process where objects of a fixed cross-sectional profile are formed. The material of the optical element is pushed or drawn through a dye of the desired cross-section. Depending on the cross-section, the radiation entrance surface and the radiation exit surface of the optical element can be formed in a desired manner. By this extrusion, an elongated optical element is formed which has a long radiation entrance surface to which a plurality of light-emitting diodes can be optically coupled.

Further, the optical element has an elongated single radiation exit surface through which the radiation of the light-emitting diodes exits the optical element. The optical element can, for example, be formed from glass, a plastic material or the like. One advantage of the extruded optical element is that the surfaces of the optical element, in particular, the radiation entrance surface and the radiation exit surface, have an excellent surface finish. For example, the radiation exit and the radiation entrance surface can be formed in a particular smooth manner.

According to at least one example of the luminaire, the optical element is fixed to each of the light-emitting diodes and the interface of the radiation exit surface of the light-emitting diodes and the radiation entrance surface of the optical element is free of a connection material. That is to say, there is no connection material applied between the radiation exit surfaces of the light-emitting diodes and the radiation entrance surface of the optical element, but these surfaces are, for example, in direct contact with each other. For example, the optical element can be produced by way of hot extrusion and the not yet cooled down and therefore not yet cured optical element is pressed to the radiation exit surfaces of the light-emitting diodes. During curing of the optical element, a mechanical connection is then formed between the radiation exit surface of each light-emitting diode and the radiation entrance surface of the optical element.

According to at least one example of the luminaire, the light-emitting diodes are arranged along a virtual curve and the optical element follows that curve. The virtual curve is, for example, a straight line along which the light-emitting diodes are arranged on the carrier. The optical element follows that straight line and is, therefore, rod-shaped. For example, the optical element can have a cylindrical shape in this case. The virtual curve can, for example, be wave-like, semi-circular, circular, helical, spiral, or a combination of these or other curve characteristics.

According to at least one example of the luminaire, the optical element is flexible. "Flexible" means that the optical element can be bent without being destroyed. In this case, the optical element is, for example, formed from a plastic material. With advantage, the optical element can be bent along a virtual curve which follows the virtual curve along which the light-emitting diodes of the luminaire are arranged.

According to at least one example of the luminaire, both carrier and optical element are flexible. In this case, the luminaire itself is flexible and it is, for example, possible to attach the luminaire to a curved surface such that the luminaire follows the curve shape of that surface. In this case, the carrier is, for example, given by a flexible printed circuit board and the optical element is formed from a flexible plastic material.

According to at least one example of the luminaire, the optical element is the sole optical element of the luminaire. In this case, it is in particular possible that the light-emitting diodes are free from a lens. In other words, the radiation emitted from the light-emitting diodes is only shaped by the optical element and not by further optical elements, which are arranged between the radiation exit surface of each light-emitting diode and the optical element.

According to at least one example of the luminaire, each of the light-emitting diodes is a light-emitting diode chip. In this case, the light-emitting diode chips of the luminaire are directly optically coupled to the optical element. For example, the radiation exit surface of the light-emitting diode and, therefore, the radiation exit surface of each light-emitting diode chip is in direct contact with the radiation entrance surface of the optical element. Heat, which is produced by the light-emitting diode chips, is at least partially dissipated by the optical element. At least in this case, the optical element can be considered as a heat sink for the heat produced by the light-emitting diodes.

Turning now to the drawings and the exemplary structures, similar or similarly acting constituent parts are provided with the same reference symbols. The elements illustrated in the figures and their size relationships among one another should not be regarded as true to scale. Rather, individual elements may be represented with an exaggerated size for the sake of better presentability and/or for the sake of better understanding.

Figure 1B:
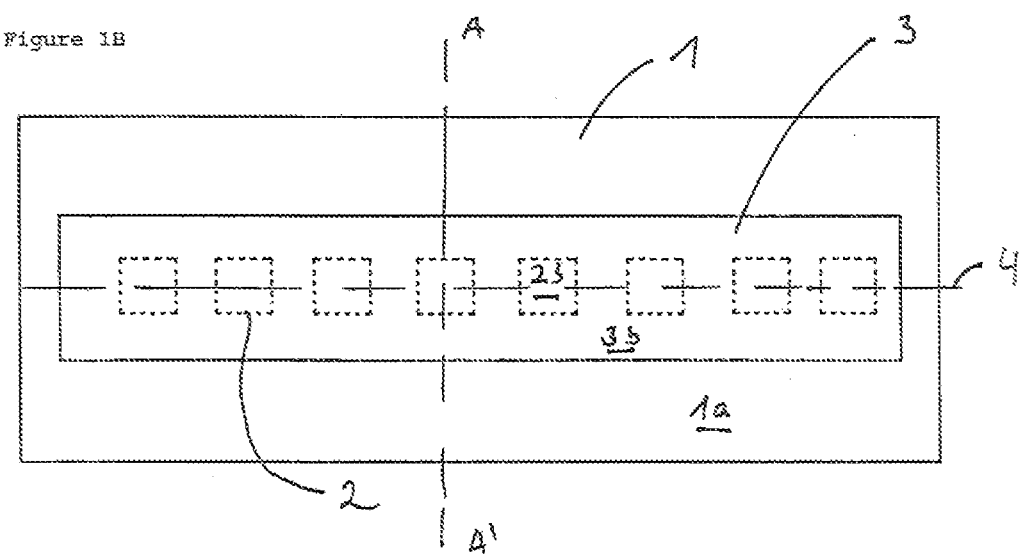

FIG. 1A shows a cross-sectional view of a first example of a luminaire along the line A-A'. FIG. 1B shows a schematic top view of this luminaire.

The luminaire comprises a carrier 1. The carrier 1 is, for example, a printed circuit board. The carrier 1 has a mounting surface 1a. A plurality of light-emitting diodes 2 are mounted and electrically connected to mounting surface 1a of carrier 1. Each light-emitting diode 2 comprises one light-emitting diode chip 21 which is encased by a casting compound 22. The surface of the casting compound 22 which faces away from the mounting surface 1a is the radiation exit surface 23 of the light-emitting diode 2.

The radiation exit surface 23 of the light-emitting diode 2 is in direct contact with the optical element 3. It is possible that a connection material is arranged between the radiation exit surface 23 of the light-emitting diode 2 and the radiation entrance surface 3a of the optical element 3, through which radiation from all light-emitting diodes 2 of the luminaire enters the optical element 3. The optical element 3 further comprises a radiation exit surface 3b through which radiation of the light-emitting diodes 2 leaves the optical element 3. The optical element 3, for example, disperses the radiation which passes through it.

The optical element 3 is an extruded optical element formed by extrusion. The optical element 3 is rod-shaped and follows the virtual curve 4 along which the light-emitting diodes 2 are arranged on carrier 1. In this example, the virtual curve 4 is a straight line.

In the example described in connection with FIGS. 1A and 1B, the optical element 3 can be formed from a glass, a plastic material or the like. The optical element 3 is the sole optical element of the luminaire. The light-emitting diodes 2 of the luminaire are free from an additional lens which would be arranged between the casting compound 22 and the optical element 3.

The optical element can be flexible or hard to suit its application. An extruded optical element is in particular cheap and can be made out of many transmissive materials such as glass, plastic material or the like. The material of the optical element can further be filled with light scattering particles and/or particles of a phosphor material which, for example, absorbs the light produced by the light-emitting diode 2 and re-emits light of a different color.

Figure 2:
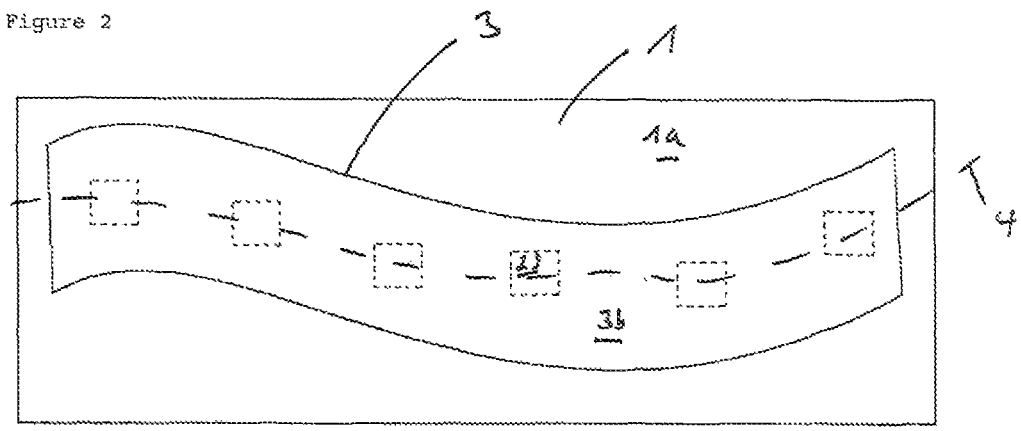
FIG. 2 schematically shows a second structure of a luminaire.

FIG. 2 shows a schematic top view of a second example of a luminaire. In this example, the virtual curve 4 is a wave-like curve. The optical element 3 follows that wave-like curve. For example, the optical element 3 is flexible.

Figure 3A:
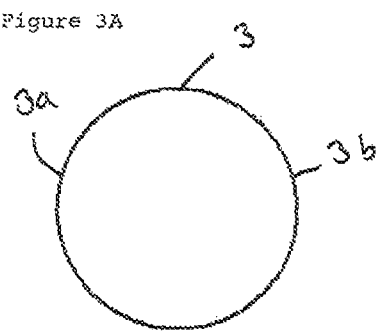
FIGS. 3A and 3B show cross-sectional views of optical elements for structures of a luminaire.
Figure 3B:
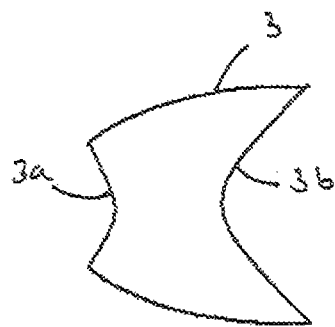

In connection with FIGS. 3A and 3B, two different examples of optical elements for luminaires are shown in a cross-sectional view. The optical element 3 of FIG. 3A has a cylindrical shape. The optical element 3 of FIG. 3B has a convex radiation entrance surface 3A and a convex radiation exit surface 3B. The optical element 3 is in both cases an extruded optical element.

Figure 4:
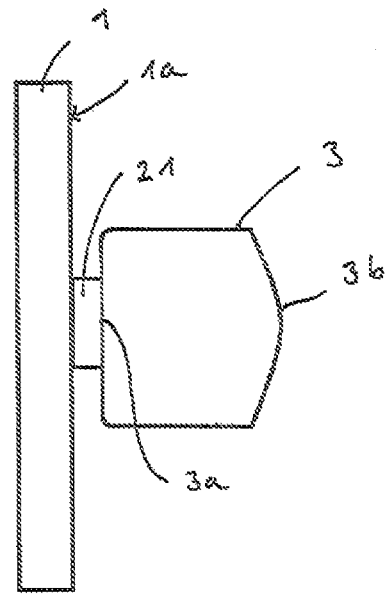
FIG. 4 schematically shows a third structure of a luminaire.

In a further example, shown in FIG. 4, it is possible that the light-emitting diodes 2 of the luminaire are given by light-emitting diode chips 21. In this case, each light-emitting diode is free from a housing and free from a casting compound 22. The light-emitting diode chips 21 can be in direct contact with the optical element 3.

Figure 5:
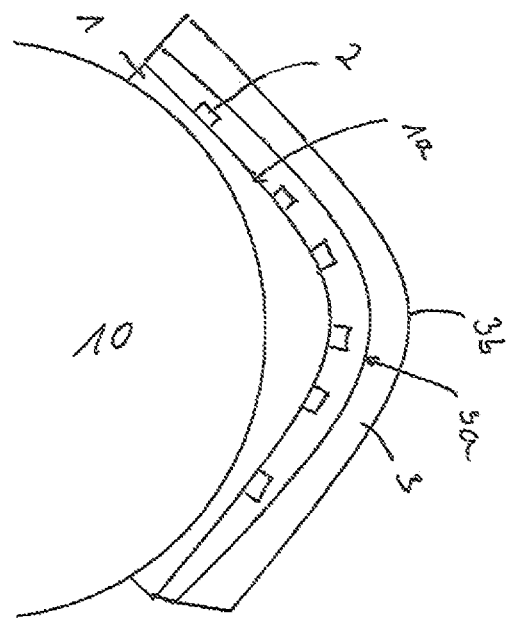
FIG. 5 schematically shows a fourth structure of a luminaire.

In a further example, shown in FIG. 5, carrier 1 and optical element 3 are flexible. In this case, the carrier 1 is, for example, given by a flexible printed circuit board. Carrier 1 can be attached to the curved surface of a body 10. Circuit board 1 and optical element 3 follow the characteristics of the curved surface.

This disclosure is not restricted to the representative examples by the description on the basis of those examples. Rather, the disclosure encompasses any new feature and also any combination of features which, in particular, comprises any combination of features in the appended claims and any combination of features in the examples, even if the feature or combination itself is not explicitly specified in the claims or selected examples.

The invention claimed is:

1. A luminaire comprising:
   a flexible carrier having a mounting surface;
   at least two light-emitting diodes, each light-emitting diode having a radiation exit surface;
   a flexible optical element having a radiation entrance surface,
   wherein
   the light-emitting diodes are arranged on the mounting surface of the carrier;
   the optical element is fixed to each of the light-emitting diodes and arranged solely on a side of the light-emitting diodes facing away from the carrier;
   the radiation exit surface of each light-emitting diode is optically coupled to the radiation entrance surface of the optical element,
   the radiation exit surface of each light-emitting diode and the radiation entrance surface of the optical element are in direct contact with each other, and
   the optical element is a sole optical element of the luminaire.

2. The luminaire according to claim 1, wherein the optical element is an extruded optical element.

3. The luminaire according to claim 1, wherein an interface of the radiation exit surface of each light-emitting diode and the radiation entrance surface of the optical element is free of a connecting material.

4. The luminaire according to claim 1, wherein the light-emitting diodes are arranged along a virtual curve and the optical element follows said curve.

5. The luminaire according to claim 1, wherein the optical element has a single radiation exit surface.

6. The luminaire according to claim 1, wherein the optical element is flexible.

7. The luminaire according to claim 1, wherein the carrier and the optical element are flexible.

8. The luminaire according to claim 1, wherein the optical element is a sole optical element of the luminaire.

9. The luminaire according to claim 1, wherein each of the light-emitting diodes is free from a lens.

10. The luminaire according to claim 1, wherein each of the light-emitting diodes is a light-emitting diode chip.

11. The luminaire according to claim 4, wherein the optical element has a cylindrical shape, the virtual curve being the length of said cylinder.

12. The luminaire according to claim 4, wherein the optical element has a convex radiation entrance surface and a convex radiation exit surface.

13. The luminaire according to claim 4, wherein the virtual curve is wave-like, semi-circular, circular, helical, spiral, or a combination of these.

14. The luminaire according to claim 4, wherein the virtual curve is a straight line and the optical element is rod-shaped and follows said straight line.

15. The luminaire according to claim 4, wherein the optical element has a single radiation entrance surface.

16. A luminaire comprising:
   a carrier having a mounting surface;
   at least two light-emitting diodes, each light-emitting diode having a radiation exit surface;
   an optical element having an elongated shape and a radiation entrance surface,
   wherein
   the light-emitting diodes are arranged on the mounting surface of the carrier and along an elongated virtual curve, the optical element following the curve;
   the optical element is arranged solely on a side of the light-emitting diodes facing away from the carrier;
   the radiation exit surface of each light-emitting diode is optically coupled to the radiation entrance surface of the optical element;
   the radiation exit surface of each light-emitting diode and the radiation entrance surface of the optical element are in direct contact with each other;
   the optical element is a solid body; and
   both the carrier and the side faces of the light-emitting diode are free of material of the optical element.

17. The luminaire according to claim 1, wherein the side of the carrier opposite to the mounting surface is freely accessible.

18. The luminaire according to claim 1, wherein both the carrier and the side faces of the light-emitting diode are free of material of the optical element.

19. The luminaire according to claim 1, wherein the luminaire is flexible.

20. The luminaire according to claim 11, wherein the radiation entrance face and the radiation exit face are curved toward an inside portion of the optical element.

21. The luminaire according to claim 16, wherein the side of the carrier opposite to the mounting surface is freely accessible.

* * * * *